United States Patent [19]
DeGood et al.

[11] Patent Number: 6,131,599
[45] Date of Patent: Oct. 17, 2000

[54] RUPTURE DISK CONTROLLED MECHANICALLY ACTUATED PRESSURE RELIEF VALVE ASSEMBLY

[75] Inventors: Robert L. DeGood, Oak Grove; James O. Hinrichs, Odessa, both of Mo.

[73] Assignee: Fike Corporation, Blue Springs, Mo.

[21] Appl. No.: 09/276,426

[22] Filed: Mar. 25, 1999

[51] Int. Cl.[7] .................................................. F16K 17/14
[52] U.S. Cl. ........................ 137/70; 137/68.27; 137/910
[58] Field of Search ............................. 137/68.23, 68.27, 137/70, 797, 910; 220/89.2

[56] References Cited

U.S. PATENT DOCUMENTS

| | | | |
|---|---|---|---|
| 1,311,774 | 7/1919 | Ritter | 137/70 X |
| 2,141,847 | 12/1938 | Tennant | 137/70 |
| 3,484,817 | 12/1969 | Wood | 220/89.2 |
| 3,780,793 | 12/1973 | Didycz et al. | 137/910 X |
| 4,240,458 | 12/1980 | Huff . | |
| 4,404,982 | 9/1983 | Ou | 137/68.27 X |
| 4,953,579 | 9/1990 | Phillips et al. . | |
| 5,012,834 | 5/1991 | Taylor . | |
| 5,226,442 | 7/1993 | Taylor . | |
| 5,273,065 | 12/1993 | Taylor . | |
| 5,348,039 | 9/1994 | Taylor et al. . | |
| 5,373,864 | 12/1994 | Taylor . | |

FOREIGN PATENT DOCUMENTS

| | | |
|---|---|---|
| 0762028 | 3/1997 | European Pat. Off. . |
| 2224692 | 10/1974 | France . |

*Primary Examiner*—John Rivell
*Attorney, Agent, or Firm*—Hovey, Williams, Timmons & Collins

[57] ABSTRACT

Improved burst disk-type pressure responsive valve assemblies (20, 184) of the pressure relief and shutdown variety are provided which utilize frangible burst disks (30, 204) which largely determine the set point pressures for the valves. The assemblies (20, 184) include a housing (22, 186) having an inlet (24, 188), an outlet (26, 190) with a valve seat (28, 192) therein. The housing (22, 186) also supports a frangible burst disk (30, 204). An actuating unit (32, 210) within the housing (22, 186) includes a shiftable, pressure responsive piston (78, 212) supporting a valve stem actuator rod (82, 214); the rod (82, 214) is operatively coupled with a disk actuating element (84, 216) located adjacent a face of the rupture disk (30, 204). When an overpressure is sensed at the inlet (24, 188), the actuating unit (32, 210) serves to burst the disk (30, 204), allowing the piston (78, 212) to move relative to the valve seat (28, 192) to establish or close communication between the inlet (24, 188) and outlet (26, 190). The valve assemblies (20, 184) can be easily repaired or retrofitted in the field, without the need for extensive dismantling of conduits or the like. Use of disks (30, 204) which rupture during valve operation affords a visual indication of valve operation and permits fabrication of high capacity, long stroke length valves.

38 Claims, 7 Drawing Sheets

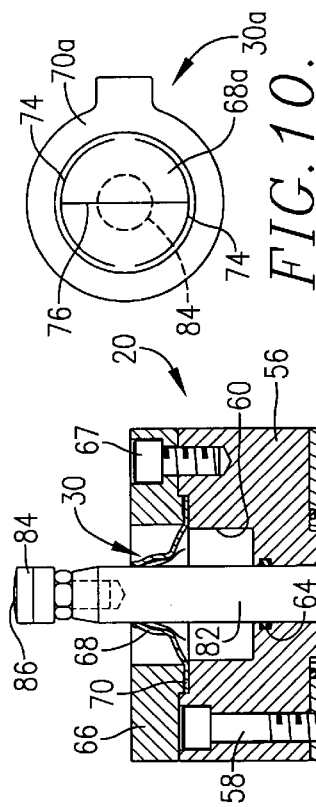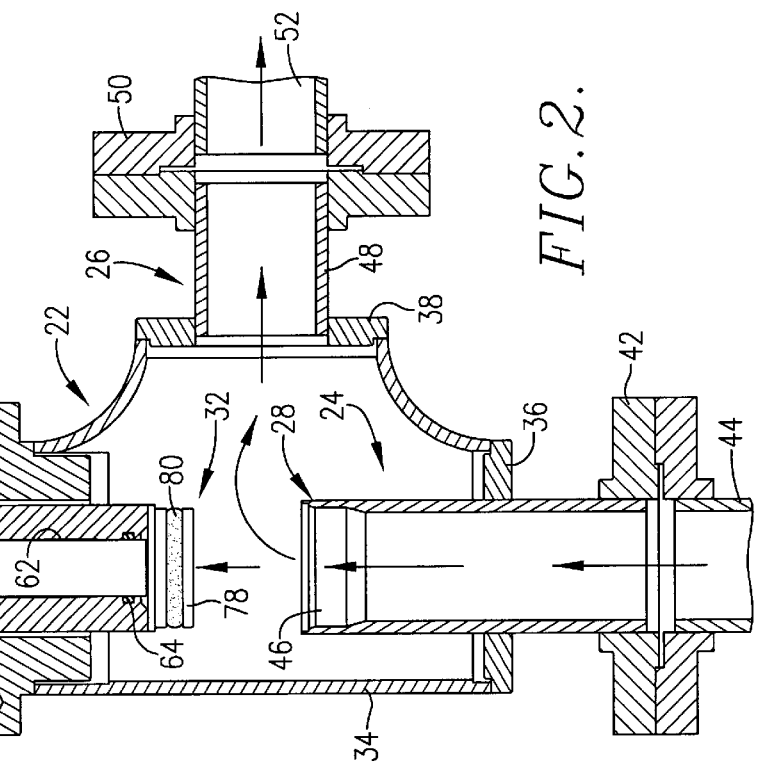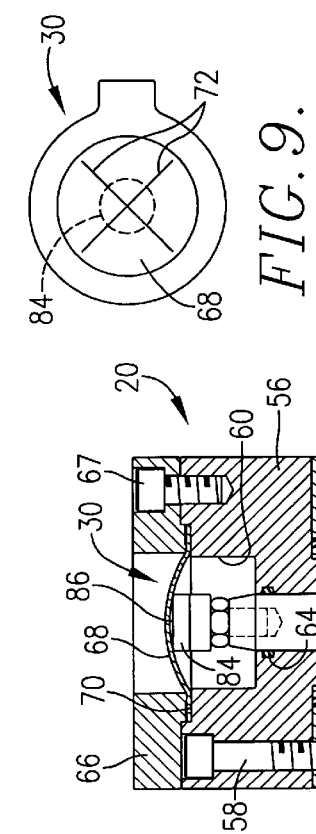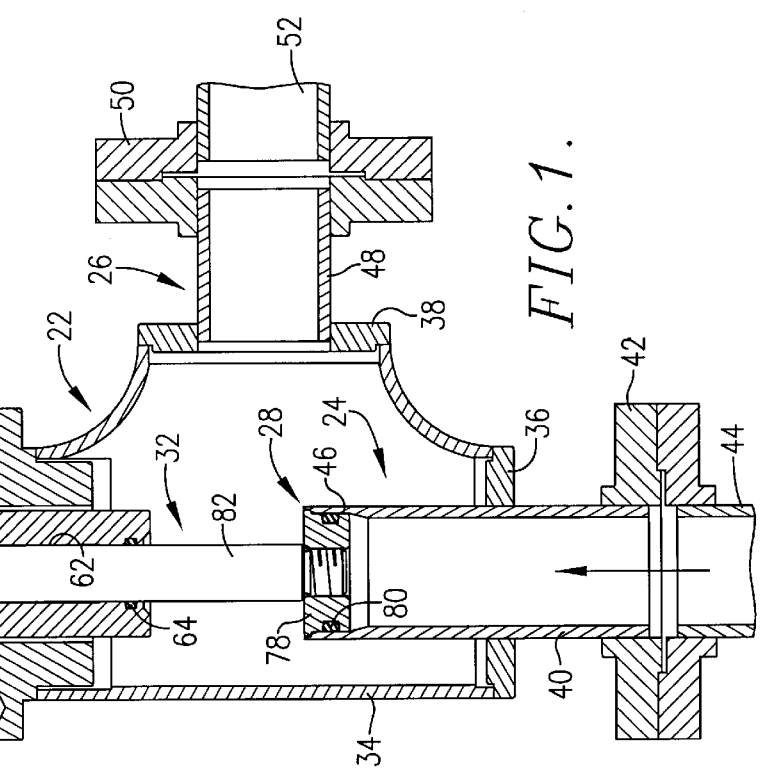

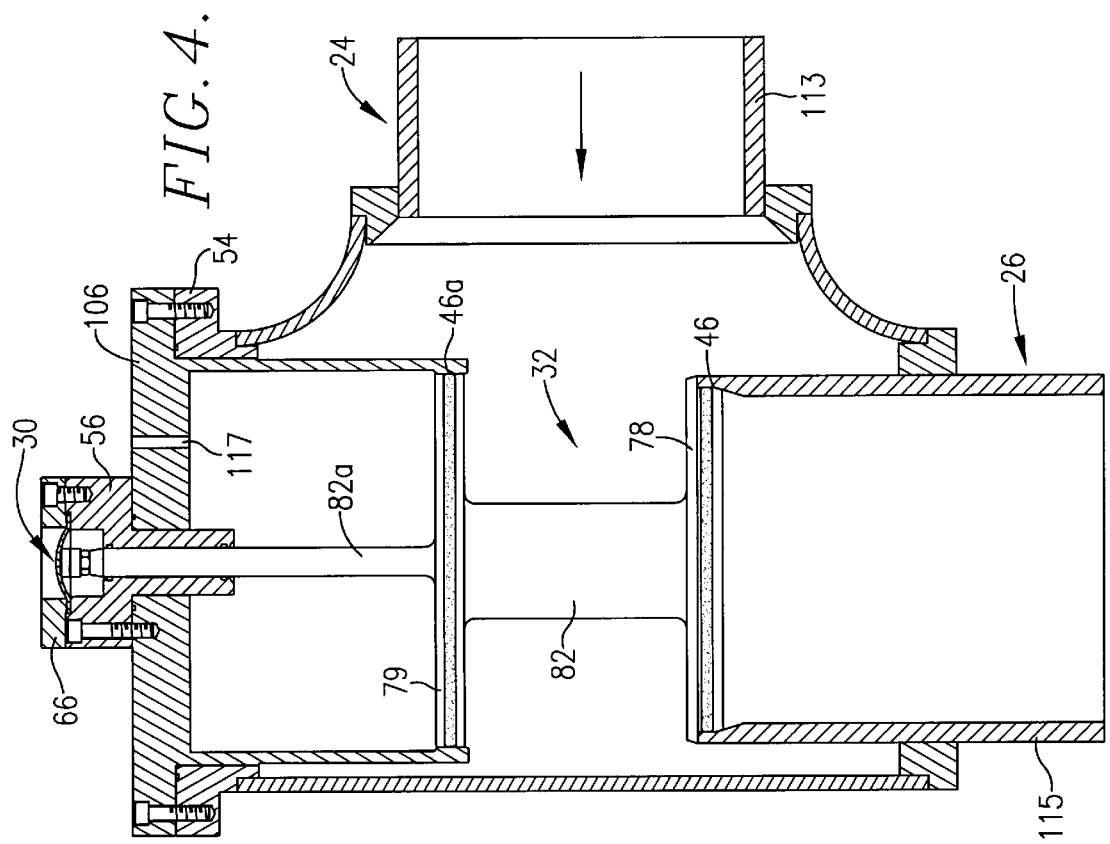
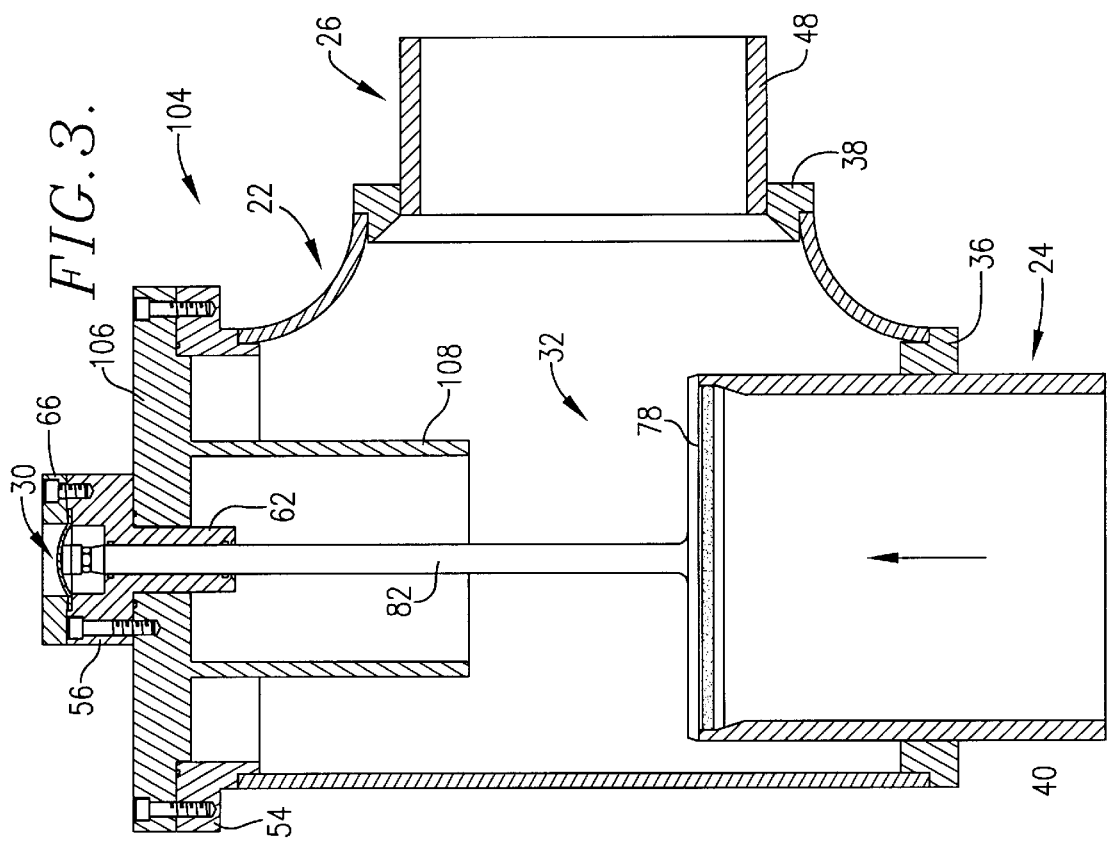

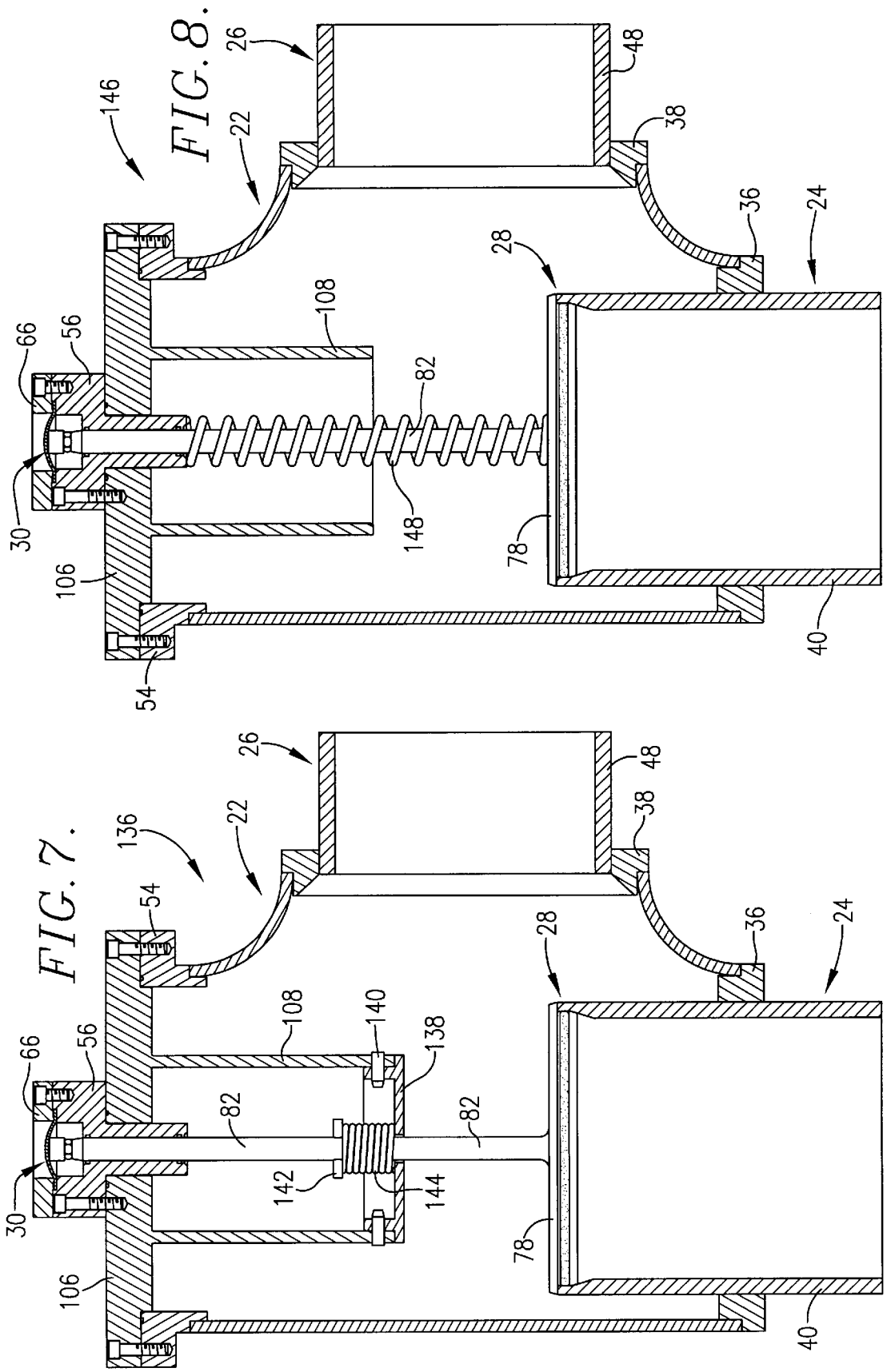

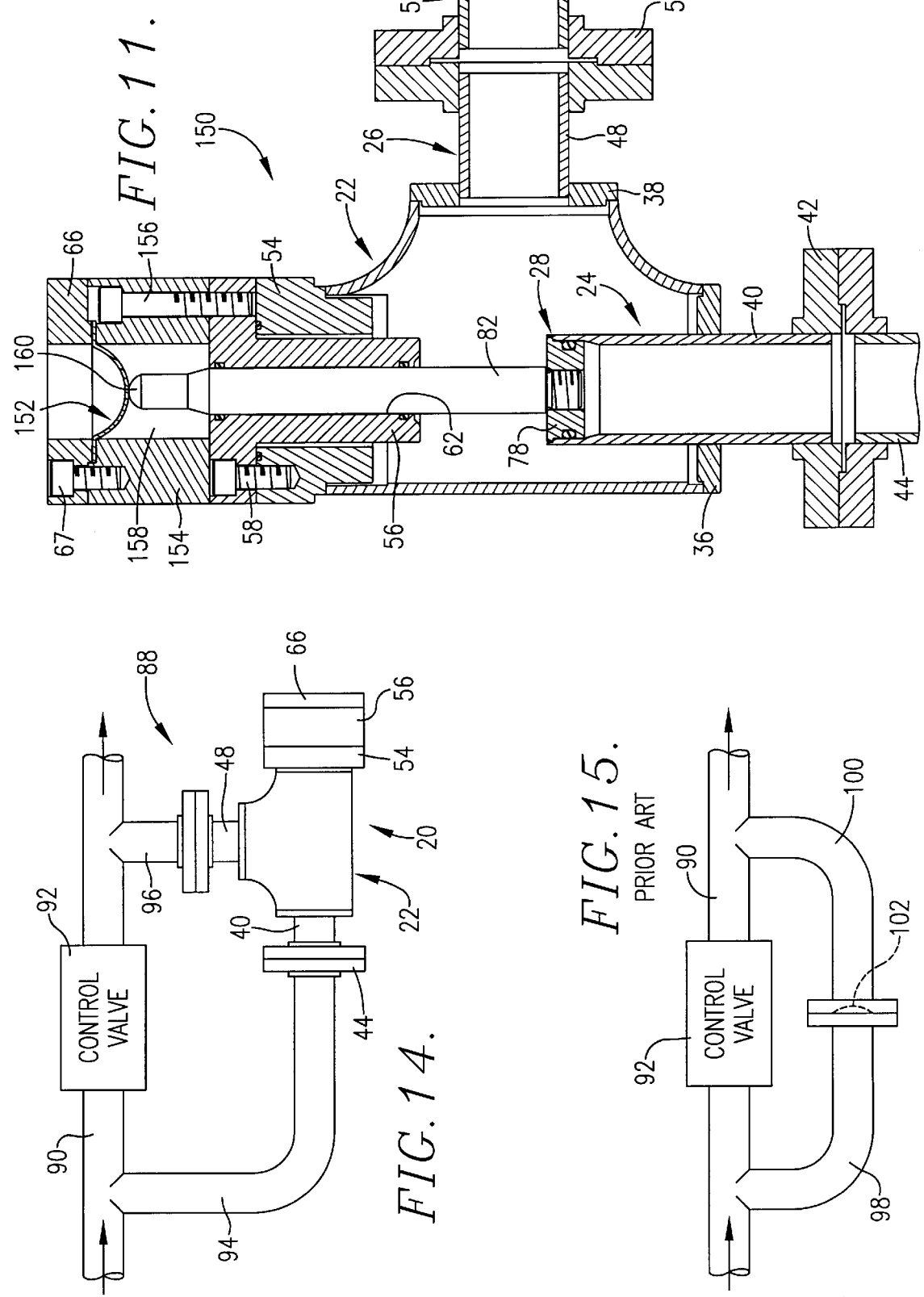

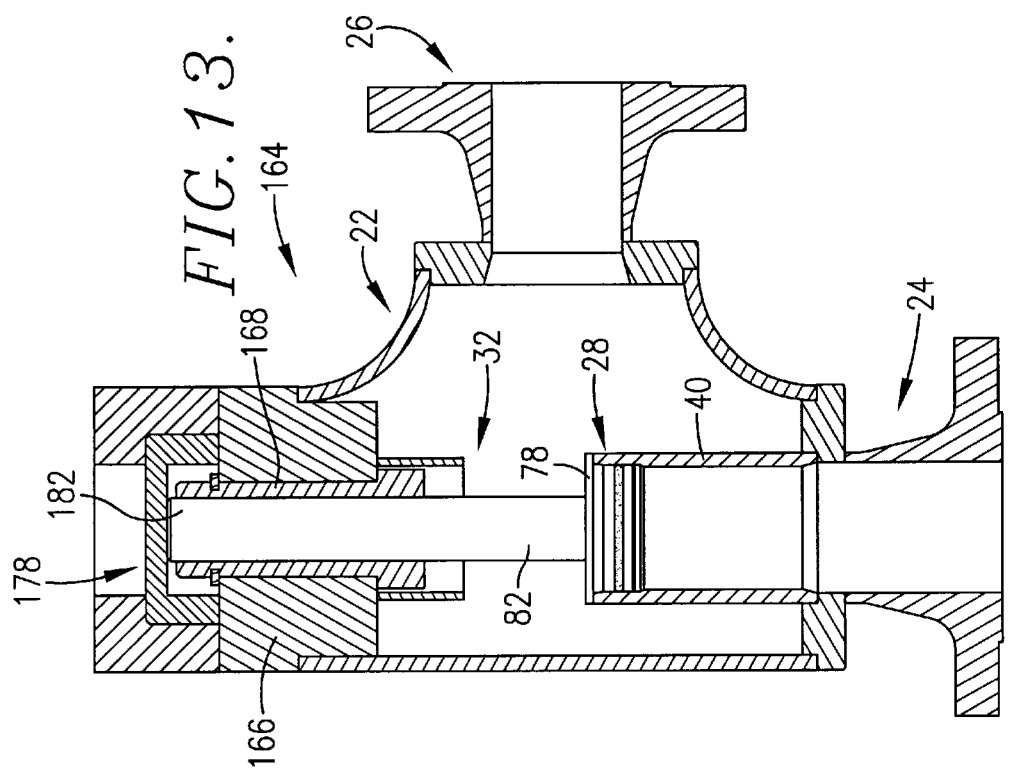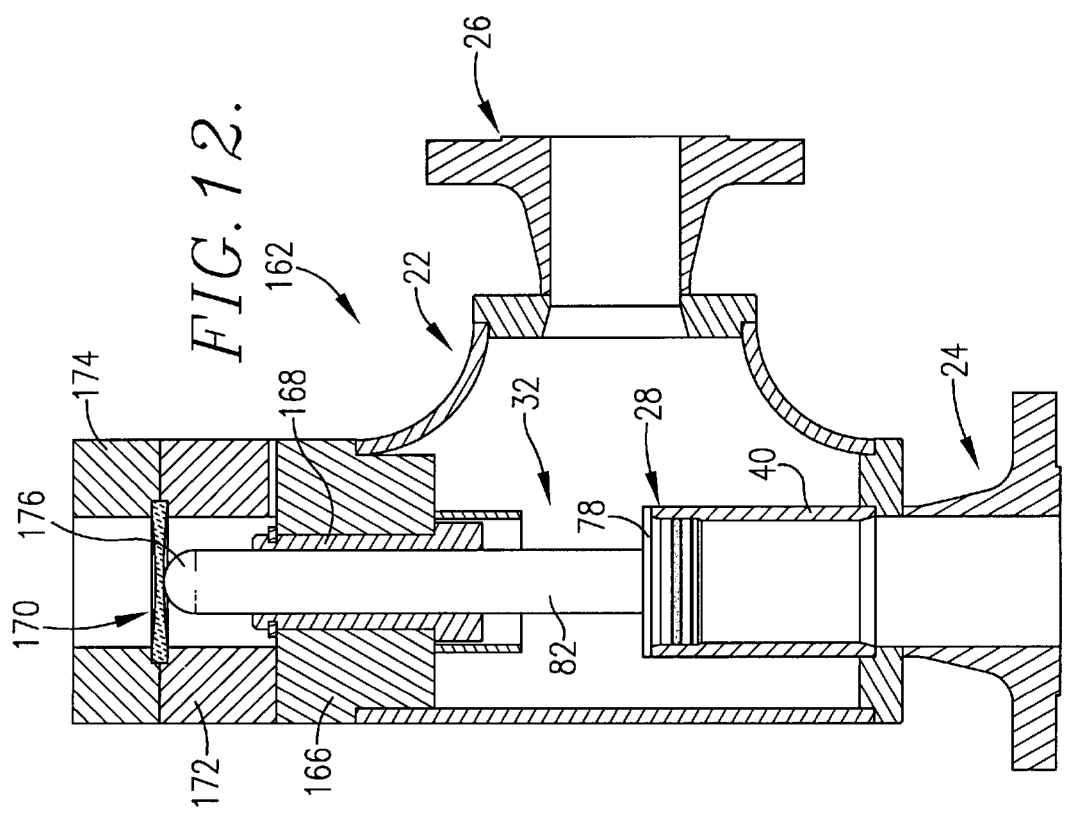

RUPTURE DISK CONTROLLED MECHANICALLY ACTUATED PRESSURE RELIEF VALVE ASSEMBLY

BACKGROUND OF THE INVENTION

1. Field of the Invention

The present invention is broadly concerned with pressure responsive valve assemblies (which may be of the pressure relief or shutdown type) which are equipped with a rupture disk and a pressure-actuated unit which serves to both actuate the valve and to rupture the disk when the preselected valve set point pressure is exceeded. More particularly, the invention pertains to such valve assemblies, and their use in bypass arrangements, wherein the valve assemblies preferably include small, easily replaceable, concavo-convex, scored forward-acting or reverse buckling metallic rupture disks which can be accurately manufactured to achieve relatively precise, repeatable pressure set points for the valves over a wide range of set points and valve sizes. The valve assemblies may also be constructed so that upon actuation a visual indication of disk rupture can be observed.

2. Description of the Prior Art

Pressure relief or shut down valves have long been provided as a part of safety equipment in a wide variety of situations, e.g., in refineries and chemical processing plants where high pressure fluids are handled. One typical use for relief valves is in bypass assemblies associated with refinery flare lines. Such lines are equipped with butterfly control valves which, if they become jammed or inoperative, can lead to catastrophic failures and explosions. Accordingly, it is common to provide a loop-type bypass conduit around each butterfly valve, with the bypass conduit equipped with an in-line valve or pressure relief device such as a rupture disk. Thus, if a butterfly valve failure occurs, the flare gas is diverted to the bypass line. As pressure builds up in the bypass line it at some point exceeds the burst pressure for the disk or the set point pressure for the valve, whereupon the disk ruptures or the valve operates, so as to open the bypass and relieve the pressure, with the flare gas delivered downstream of the butterfly valve.

The use of in-line burst disks as pressure relief devices in flare bypass arrangements, while safe and effective, requires a relatively complex operation to change out a burst disk. Thus, disk replacement requires unbolting of the bypass piping which can result in spillage of fluids and consequent plant contamination. These difficulties are even more pronounced in the case of large bypass units (e.g., 24–36 inch piping) having correspondingly large disks. Furthermore, in large scale bypass assemblies, the cost of replacement rupture disks becomes significant.

A number of valve designs have also been proposed for use in bypass or similar contexts. One type of valve, exemplified in U.S. Pat. No. 5,297,575 makes use of a pressure-responsive piston which engages an axially extending, collapsible pin. In the event of a pressure rise above the valve set point, the piston is shifted to collapse the retaining pin, thereby allowing valve opening. Similar collapsing pin valve units of the pressure relief or shutdown variety are illustrated in U.S. Pat. Nos. 5,348,039, 5,273,065, 5,012,834, 5,226,442 and 5,373,864.

A significant problem with collapsing pin valve designs is the difficulty in retrofitting the valves to alter the set point pressure thereof. Thus, a given valve unit of this type is provided with pin support structure specific to a particular type of collapsible pin. If it is desired to change the valve set point pressure it is necessary to reconfigure the pin-supporting structure of the valve to accommodate a differently sized pin. This becomes a significant retrofit project, thereby detracting from the usefulness of the collapsing pin valve units.

Valves have also been proposed in the past which make use of pressure-responsive diaphragms which are movable from a normal position to an overcenter position when the valve set point pressure is exceeded. Typical units of this type are disclosed in U.S. Pat. Nos. 4,240,458 and 4,953,579. These valve assemblies are relatively complex and the use of diaphragms makes them difficult to retrofit to alter the valve set point.

European Patent Application 762028 describes a pressure sensitive valve equipped with a piston and rod assembly which serves to reverse buckle a metallic membrane upon valve operation. The inventors assert that it is important that the membrane buckle, as opposed to burst, during operation so as to prevent long term fatigue in the membrane. However, valves of this type are deemed deficient for a number of reasons. First, membrane buckling without bursting thereof severely limits the valve stroke. Hence, with relatively large sized valves and correspondingly larger buckling membranes, the amount of piston and rod travel is limited, thereby limiting the distance that the piston can move off of the valve seat. This limited piston movement may be insufficient to allow rapid and complete venting of the protected conduit or the like. Furthermore, the membranes disclosed in the '028 application are not scored and have angled portions to facilitate buckling (and reversal of the membrane to its original position). This makes the operation of the membrane difficult to calibrate and predict, so that the operation of the valve may be erratic.

There is accordingly a real and unsatisfied need in the art for simplified pressure-responsive valves which can be constructed for precise set point pressure operation while allowing easy field repair and retrofitting thereof without the need for significant disassembly of valve conduits or the valve assembly itself.

SUMMARY OF THE INVENTION

The present invention overcomes the problems outlined above and provides a simplified, reliable, rupture disk-type pressure responsive valve assembly (either of the relief or shutdown variety) which can be used in a variety of contexts and may be easily repaired or retrofitted in the field without the need for extensive dismantling of associated piping or the like. Broadly speaking, the valve assemblies of the invention include a chamber-defining housing having an inlet and an outlet with a valve seat within the housing. A rupture disk also forms a part of the valve assembly together with a pressure responsive actuating unit which senses inlet pressure; when such inlet pressure exceeds the predetermined maximum set point pressure for the valve, the actuating unit moves to rupture the disk as a part of the valve operation. The actuating unit preferably includes an elongated actuator rod at least partially located within the valve housing, an actuator element adjacent a face of the rupture disk and operably coupled with the rod, and a pressure responsive rod member coupled with the rod, engageable with the valve seat, and positioned to experience the pressure conditions at the valve inlet.

The design characteristics of the rupture disk establish the set point pressure for the valve assembly, and to this end a variety of different types of frangible disks may be employed. For example, concavo-convex forward acting disks can be used which would commonly have one or more lines of weakness formed in either or both faces thereof. Such lines of weakness may be formed by any convenient technique such as milling, cutting or scoring, with the latter being preferred. Alternately, a metallic reverse buckling rupture disk can be used, which may or may not be provided with lines of weakness. In some instances, it has been found that a Teflon coating on the face of such disks engaged by the valve actuating unit increases the useful life of the disks. Specifically, the valve assemblies of the invention will typically be subjected to a large number of pressure fluctuations below the set points thereof which has the effect of creating corresponding axial force fluctuations against the rupture disks. The use of Teflon coatings may inhibit early disk failure owing to such force fluctuations. Finally, other frangible disks such as those formed of ceramic or graphite materials may be employed.

In the case of relief valves, it is preferred to provide the valve seat as a part of a tubular valve inlet, and in these designs, the valve member is in the form of a piston normally located within the tubular inlet in engagement with the valve seat, whereas the actuator rod is coupled with the piston. The piston is shiftable in response to a pressure rise above the set point, so as to cause the actuator element to move and ultimately rupture the disk, which also communicates the valve inlet and outlet for pressure relief. The rupture disk is conveniently supported in a bonnet attached to the valve housing, so that the motion of the piston and rod is essentially rectilinear. If needed, assist and/or return springs may be employed to assist in rod movement for disk rupture or valve reclosure. Moreover, if desired the disk may be mounted outboard of the valve housing, with the actuator rod coupled via an external linkage assembly to the disk-engaging actuator element.

In the case of shutdown valves, a valve seat is provided within the valve housing, with a piston normally spaced from the valve seat but engageable therewith upon valve actuation. Here again, a variety of rupture disk supports may be used with valves of this character.

The valve assemblies of the invention can be used to good effect as a part of bypass assemblies designed to bypass a control valve located within a primary conduit in the event of valve failure. Such a bypass assembly includes a pressure relief valve of the type described together with inlet and outlet conduits respectively in communication with the primary conduit on opposite sides of said primary conduit valve and the bypass valve inlet and outlet. Upon failure of the primary line control valve, the pressurized fluid is diverted to the inlet conduit and passes to the bypass valve. When the pressure rises above the bypass valve set point, the bypass valve operates, thereby allowing fluid to pass through the bypass valve and outlet conduit back to the primary conduit downstream of the failed control valve. An advantage of the present invention in such situations is that replacement of the bypass valve rupture disk is a simple matter which can be readily accomplished without the need for dismantling conduits or other complicated operations. Moreover, because of the use of rupture disks in accordance with the invention, a relatively small size disk can be used even with very large conduits and fluid flows. Finally, the improved valve design of the invention allows such a bypass valve to be retrofitted with a differently configured rupture disk, so as to alter the set point pressure of the bypass valve as desired.

BRIEF DESCRIPTION OF THE DRAWINGS

FIG. 1 is a vertical sectional view of a pressure relief valve in accordance with the invention, equipped with a forward-acting rupture disk and illustrated in its normally closed position;

FIG. 2 is a vertical sectional view similar to that of FIG. 1, but illustrating the relief valve in its operated, valve-open position with the disk ruptured;

FIG. 3 is a vertical sectional view of another pressure relief valve in accordance with the invention and similar to that of FIG. 1, but equipped with a large tubular inlet and a corresponding large valve piston;

FIG. 4 is a cross-sectional view of another pressure relief valve equipped with large diameter dual pistons, with the valve shown in its normally closed position;

FIG. 7 is a vertical sectional view of a pressure relief valve similar to that shown in FIG. 3, wherein a compression spring is provided to assist in valve actuation;

FIG. 8 is a vertical sectional view of another pressure relief valve similar to that shown in FIG. 3, equipped with a compression spring serving to close the valve after actuation thereof;

FIG. 9 is a plan view of a rupture disk having a pair of crossed score lines on the convex face thereof;

FIG. 10 is a plan view of another rupture disk having a double hinge pattern of score lines in the convex face thereof;

FIG. 11 is a vertical sectional view of a pressure relief valve similar to that of FIG. 1, but illustrating the use of a reverse buckling rupture disk;

FIG. 12 is a vertical sectional view of a pressure relief valve similar to that of FIG. 1, depicting the use of a ceramic rupture disk;

FIG. 13 is a vertical sectional view of a pressure relief valve similar to that of FIG. 1, depicting the use of a cup-shaped graphite rupture disk;

FIG. 14 is a schematic view illustrating the use of pressure relief valves of the invention in a bypass assembly;

FIG. 15 is a schematic view illustrating a typical prior art bypass assembly.

DETAILED DESCRIPTION OF THE PREFERRED EMBODIMENT

Figure 5:
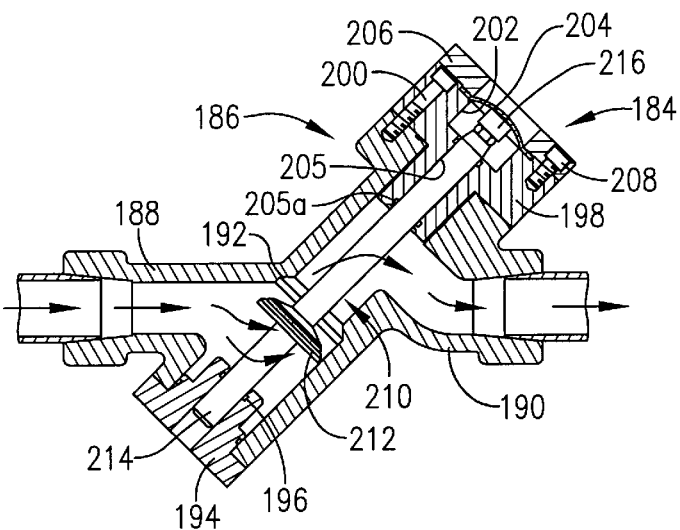
FIG. 5 is a vertical sectional view of a pressure responsive shutoff valve including a forward-acting rupture disk.

Turning now to the drawings and particularly FIGS. 1 and 2, a pressure responsive relief valve assembly 20 is illustrated. The valve assembly 20 broadly includes a chamber-defining housing 22 having an inlet 24, an outlet 26 and a valve seat 28. In addition, a rupture disk 30 is provided along with a pressure responsive actuating unit 32 which operates when the valve set point pressure is exceeded to communicate inlet 24 and outlet 26, and to burst disk 30.

In more detail, the housing 22 is essentially a hollow body having a primary wall 34 with end caps 36 and 38. As shown, the cap 36 supports an elongated, tubular inlet pipe 40 defining the inlet 24 and which is coupled via a union 42 with a process pipe 44. As shown, the inboard end of inlet pipe 40 within the confines of housing 22 has an inner surface 46 defining the valve seat 28. The end cap 38 also supports a tubular outlet pipe 48 which defines valve outlet 26 and communicates with the interior of housing 22. The outlet pipe is coupled by a union 50% D-86 pt with an exit pipe 52. The end of housing 22 remote from end cap 36 has an annular mounting block 54 affixed thereto.

An elongated, tubular bonnet 56 is secured to block 54 by screws 58 and presents an upper recess 60 as well as an elongated, central, rod-receiving passageway 62. As shown, the passageway 62 is equipped with O-ring seals 64. The rupture disk 30 is mounted atop bonnet 56 and is retained in place in covering, flow-blocking relationship to recess 60 by means of annular outboard cap 66 and screws 67. As illustrated, the disk 30 is of metallic, concavo-convex configuration having a central burst area 68 as well as a peripheral flange 70; the latter is sandwiched between bonnet 56 and outboard cap 66 as shown so as to normally retain the disk 30 in place. Referring to FIG. 9, it will be observed that the convex face of burst area 68 is provided with a pair of intersecting score lines 72 which are provided to insure more reliable operation of the disk. While scoring of this type is common with metallic rupture disks, it is to be understood that the scoring (or for that matter any other line(s) of weakness formed by milling or cutting) may be provided on the concave face of the disk if desired. Moreover, a variety of alternative scoring patterns may also be used. As illustrated in FIG. 10, an alternate disk 30a has on its convex face a pair of opposed, marginal arcuate score lines 74, with a central, rectilinear score line 76 extending between and intersecting the score lines 74. The disk 30a is designed to open in a "hinge" fashion, with the halves of the disks hinging about the non-scored regions of the disk.

The actuating unit 32 includes a piston 78 which is normally seated within valve seat 28. The piston is configured to conform with the surface 46 as shown, and has an O-ring seal 80 which engages the surface 46. An elongated valve stem or actuator rod 82 is secured to the piston 78 and extends through passageway 62 to recess 60. The rod 82 has a cylindrical actuator element 84 coupled to the end thereof remote from piston 78. As illustrated, the upper butt end of the actuator element 84 is rounded as at 86 and is normally closely adjacent to (and preferably in engagement with) the inner concave surface of disk 30.

In the operation of valve assembly 20 (see FIG. 2), incoming pressurized fluid encounters piston 78 and is blocked by the seating thereof within valve seat 28. As the pressure conditions within inlet 24 increase to and above the set point pressure of the valve assembly 20 (the set point pressure being determined essentially by the characteristics of rupture disk 30), the force exerted against the disk 30 by the piston 78, rod 82 and element 84 is correspondingly increased. At or about the set point pressure such forces cause the disk 30 to rupture along the score lines 72, with the element 84 extending through the nowrupture disk as depicted in FIG. 2. As a consequence of this action, the piston 78 is fully shifted from the seat 28 thereby establishing full and open communication between inlet 24 and outlet 26. Accordingly, the pressure within the inlet 24 is relieved.

It will be appreciated that the operation of valve assembly 20 gives a desirable visual indication of valve opening, i.e., the actuating element 84 is readily visible. Moreover, because the rod 82 and element 84 extend through the ruptured disk 30, there is no effective limitation on the stroke length of the valve. Thus, even with very large conduits and fluid flows, the valve assemblies of the invention afford a rapid, reliable way of relieving dangerously high pressure conditions.

Referring to FIG. 14, a bypass assembly 88 employing the valve assembly 20 is illustrated. The assembly 88 is used as a safety measure with a primary flow conduit 90 having a control valve 92 therein. In detail, it will be observed that a bypass inlet pipe 94 leads from conduit 90 upstream of valve 92 to the inlet pipe 40 of assembly 20. Similarly, a bypass outlet pipe 96 leads from outlet pipe 48 back to primary conduit 90 downstream of valve 92.

As explained previously, in the event of a control valve failure fluid is delivered to the valve assembly 20 of bypass assembly 88. When the valve assembly 20 actuates, the fluid is delivered via the pipes 48 and 96 back to the primary conduit 90. In the event of such a sequence, it is a simple matter to replace the disk 30 and thus reclose the valve assembly 20. Specifically, the cap 66 is removed, the piston 78 is reseated within valve seat 28, and a fresh rupture disk 30 is positioned on bonnet 56. When the cap 66 is replaced, the valve assembly 20 is ready for reuse.

This simple operation is to be contrasted with typical bypass assemblies such as those shown in FIG. 15. In many prior art bypass assemblies, inlet and outlet conduits 98 and 100 are provided upstream and downstream of the control valve 92. In these installations, pressure relief is provided by a rupture disk 102 housed within the bypass piping assembly. Upon disk rupture, it is necessary to dismantle the bypass piping assembly to allow disk replacement. This is not only time-consuming but can lead to site contamination since process fluids will inevitably be lost during the conduit breakdown and rupture disk replacement. Further, as conduit sizes increase, it is necessary to correspondingly increase the size of the rupture disks used, so that such replacement disks tend to be relatively expensive.

FIGS. 3–4, 6–8, 11–13 and 16 illustrate various other relief valve assembly embodiments in accordance with the invention. In many instances, these embodiments employ many of the same basic components as the previously described valve assembly 20. Accordingly, in the ensuing description of these embodiments, like reference numerals will be applied to such similar components.

FIG. 3 depicts a large valve assembly 104 having relatively large inlet and outlet pipes 40 and 48 respectively. In this design, an apertured plate 106 is coupled to the block 54 and closes the end of the valve assembly housing; the plate 66 is provided with an inwardly extending, annular stop wall 108. The bonnet 56 is mounted on the plate 106 as shown. The operation of assembly 104 proceeds in exactly the same fashion as that described above, with the innermost butt end of the wall 108 serving as a limit on the stroke of the valve. It will be appreciated that the assembly 104 is designed for high volume situations requiring large valve throughput. At the same time, the size of disk 30 need not be increased to accommodate such a large valve.

FIG. 4 illustrates a valve assembly 110 equipped with dual pistons 78 and 79. As depicted, the piston 78 is within valve seat 28, whereas the opposed piston 79 is situated within a tubular wall 112 having an inboard valve seating surface 46a. A relatively large stem or rod 82 is interconnected between the pistons 78 and 79, whereas actuator rod 82a extends from piston 79 toward disk 30. The inlet 24 of valve assembly 110 includes inlet pipe 113, while the outlet 26 includes outlet pipe 115; it will be observed that the valve seat-defining surface 46 is formed at the inboard margin of the pipe 115. It is to be observed from FIG. 4 that the inner annular face of piston 78 is of less effective area than the opposed inner annular face of piston 79. Thus, during operation of the assembly 110, the differential pressure on the inner face of piston 79 and the pressure on the inner face of the piston 78 causes the actuating unit 32 to shift in a direction simultaneously moving the piston 78 out of engagement with seat 28 and the piston 79 out of engagement with the seat 46a when that differential pressure exceeds the resistance to movement of rod 82a offered by disk 30, i.e., the burst pressure of disk 30. The passage 117 in plate 106 serves to relieve the pressure internally of the tubular wall member 112 when the piston 78 moves out of engagement with seat 28.

Figure 6:
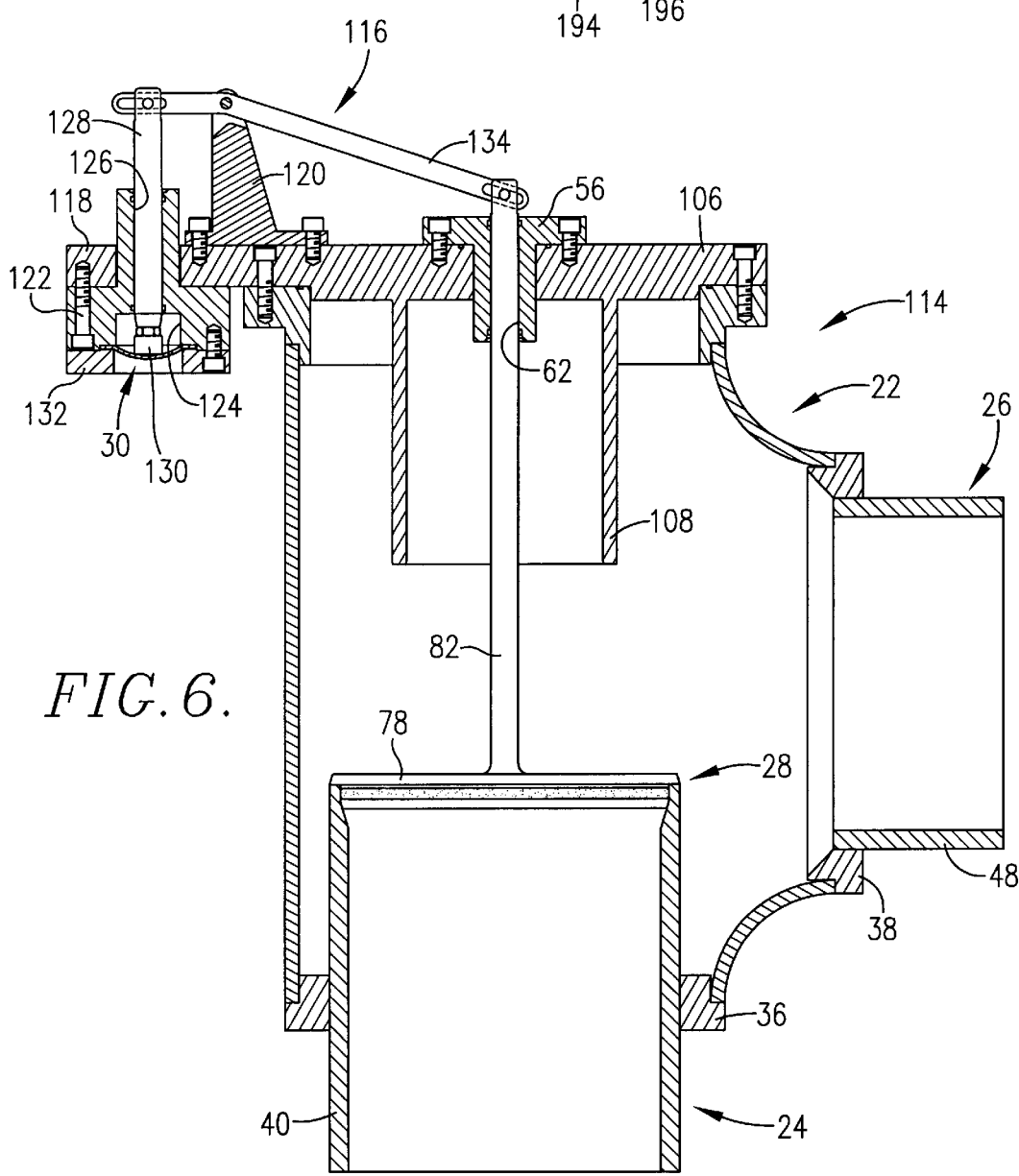
FIG. 6 is a vertical sectional view of another pressure relief valve having an exterior-mounted, forward-acting rupture disk coupled via a linkage assembly to an actuating rod.

FIG. 6 shows a valve assembly 114 which is very similar to the assembly 104 shown in FIG. 3 except that the rod 82 extends outside of housing 22 and is coupled with an exterior linkage 116 permitting actuation of the disk 30 mounted outside and astride of the housing 22. In detail, the plate 106 has a lateral extension 118 which supports an upright pivot leg 120 as well as a apertured mounting block 122. The block 122 is secured to the underside of extension 118, and has a recess 124 and passageway 126. An elongated actuator rod 128 extends through the passageway 126 as shown and is equipped with an actuator element 130. The disk 30 is mounted across the recess 124 as shown, and is held in place by annular retainer block 132. A slotted crank arm 134 is operated coupled to the ends of the rods 82 and 128, and is pivotally supported by the leg 120. This design places the rupture disk 30 out of axial alignment with the piston 78 and rod 82. It will be appreciated that in this unit the pivot point for the arm 134 may be varied to achieve different levels of force multiplication at disk 30. To this end, the arm may be straight, angled or of virtually any other desired configuration.

FIG. 7 depicts a valve assembly 136 which is again similar to that of FIG. 3. In this case however, the stop wall 108 has an apertured inner plate 138 affixed thereto by means of pins 140 or other similar expedient. Additionally, the rod 82 carries a retainer crosspin 142, and a compression spring 144 is located and captively retained between the pin 142 and inner plate 138. In this design, with the valve seated the spring 144 creates a preload toward the valve open position. Thus, the valve set point pressure is equal to the disk relief pressure less the spring preload pressure. This configuration is particularly useful in applications requiring relative low valve set points.

FIG. 8 illustrates a valve assembly 146 similar to that of FIG. 3 but differs by the provision of an elongated, compressible reclosure spring 148 extending between piston 78 and the inboard butt end of bonnet 56. The spring 148 assists in holding the valve in its closed position such that the valve set pressure is equal to the spring pressure exerted at piston 78 plus the disk relief pressure. Upon actuation of the assembly 146, the valve will be reclosed by the spring 148 when the pressure at inlet 24 falls below the spring pressure (which is substantially below the valve set point). A valve of this design may be useful in applications where it is desired to limit the exposure of process fluids to the atmosphere after valve actuation, i.e., the valve serves to minimize pollution problems. Further, the spring 148 may be used to reduce the impact load when the piston 78 reaches the end of its travel proximal to stop wall 108.

FIG. 11 shows a valve assembly 150 very similar to assembly 20 of FIG. 1, but illustrates the use of a reverse buckling disk 152 in lieu of the forward-acting disk 30. In order to accommodate the disk 152, an annular spacer block 154 is interposed between bonnet 56 and cap 66. The block 154 is secured to bonnet 56 by screws 156, and presents a central opening 158. The disk 152 is sandwiches between spacer block 154 and cap 66 and extends inwardly as shown.

The outboard end of rod 82 is also somewhat modified to present a more rounded actuating element tip 160 which engages the convex face of the disk 152. The operation of this design proceeds as outlined previously except that the disk 152 ruptures by moving overcenter or reverse buckling when the valve set point pressure is reached. Even in this embodiment, however, the disk 152 ruptures thereby affording the same advantages outlined above.

FIGS. 12 and 13 illustrate very similar valve assemblies 162, 164 each having a housing 22, inlet and outlet 24, 26, valve seat 28 and actuating unit 32. Moreover, each includes a piston 78 situated within the seat 28, the latter forming a part of the inlet pipe 40. In these instances, however, the rupture disk ends of the assemblies 162 and 164 include an annular block 166 which supports a central, annular slide bushing 168; as shown, the actuator rod 82 is received by the bushing 168. In the case of the assembly 162, a dished, ceramic rupture disk 170 is employed. The disk 170 is supported by a pair of recessed mounting blocks 172, 174 with the disk 170 sandwiched therebetween. The actuator element end 176 of the rod 82 is substantially hemispherical in shape and engages the inner face of the disk 170 as shown. In the case of assembly 164, a substantially cup-shaped graphite rupture disk 178 is used. In order to support the disk 178, a recessed annular mounting block 180 is provided which sits atop block 166 and receives the tubular sidewall of the disk. The actuating end 182 of the rod 82 is substantially flattened and engages the disk 178 as shown.

Figure 16:
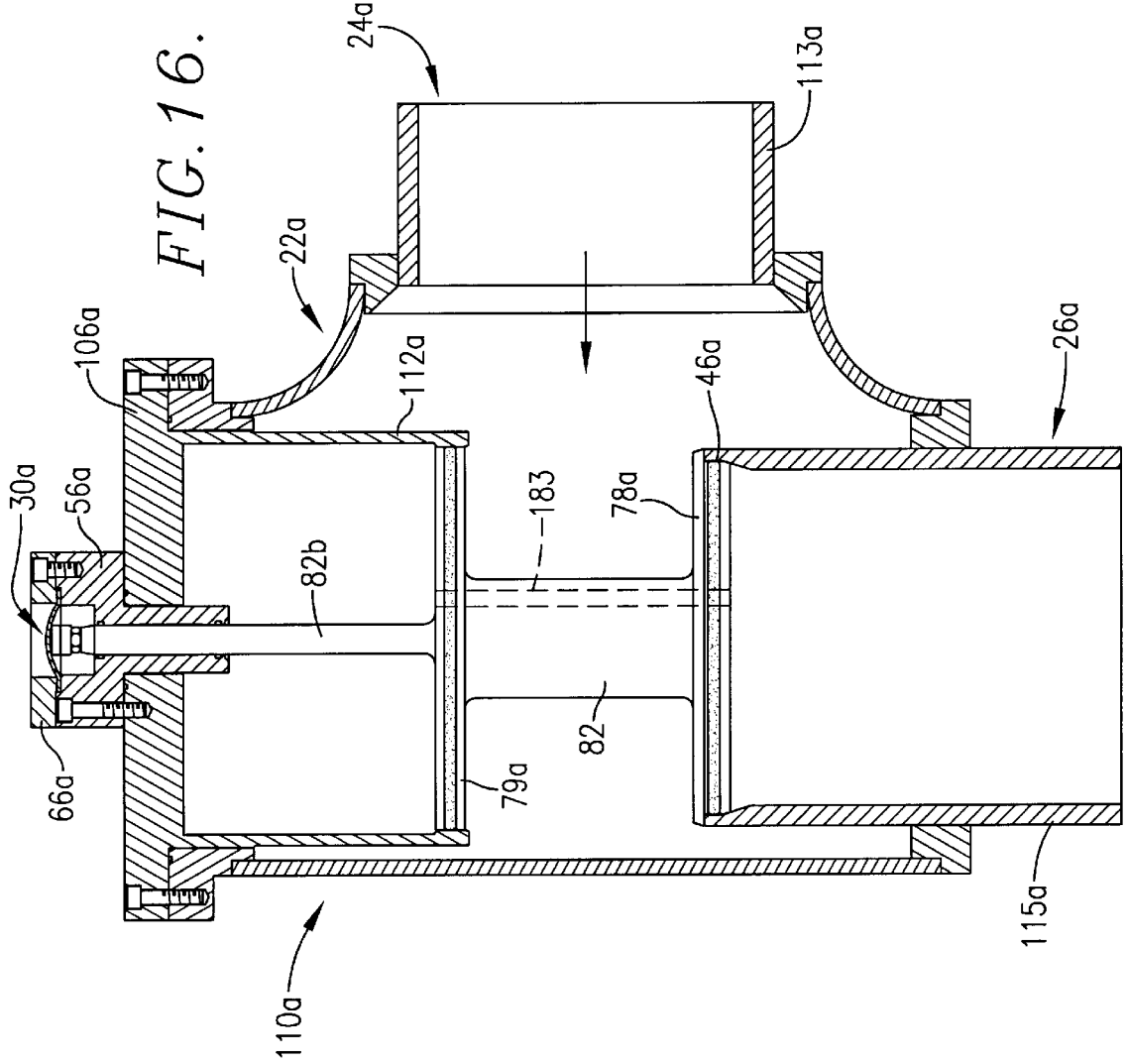
FIG. 16 is a vertical sectional view of a pressure relief valve similar to that of FIG. 4 except in this instance, the stem between the two valve members is provided with a passage intercommunicating the areas above and below the valve members.

FIG. 16 illustrates a relief valve assembly 100a very similar to that illustrated in FIG. 4, and accordingly the same reference numerals with the addition of a distinguishing "a" or "b" as appropriate, have been applied to corresponding parts. The principal differences between the FIG. 4 and FIG. 16 embodiments are that the plate 106a in FIG. 16 is imperforate, and the stem or rod 82 is provided with one or more pressure equalization passageways 183 serving to equalize the pressures in the region between pistons 79a and plate 106a and the back pressure region at the face of piston 78a remote from rod 82. The area of valve member 78a which is exposed to the downstream process pressure within valve outlet 115a is substantially equal to the area of the face of valve member 79a proximal to rupture disk 30a minus the cross-sectional area of stem 82b. Relief valve assembly 110a is especially useful in applications where the equipment or lines being protected have multiple downstream valves. In the event that one of the other multiple valves activates, to operate properly, relief valve assembly 110a associated with the other valve assemblies in the overall train, balances out variable downstream back pressures which would otherwise occur.

Turning now to FIG. 5, a shutdown valve assembly 184 is shown. In this case, the assembly 184 has an elongated tubular chamber-defining housing 186 presenting an integral tubular inlet 188 and an integral tubular outlet 190. A valve seat 192 is formed within the housing 186 between the inlet and outlet. One end of the housing 186 has an annular plug 194 having an inner O-ring seal 196. The opposite end of the housing has an annular bonnet 198 secured to the housing by screws 200. The bonnet presents a recess 202 which is spanned and closed by a metallic, forward acting rupture disk 204 essentially identical with the disk 30 described previously. In addition, the bonnet has an elongated rod-receiving passageway 205 equipped with O-ring seals 205a. The disk 204 is held in place by an outboard cap 206 and screws 208. The assembly 184 has an actuating unit 210 including a pressure responsive piston 212 mounted on an actuating rod 214. The latter is slidable within the plug 194 and the passageway 205 of bonnet 198 as shown. The actuating rod 214 is equipped with an endmost disk actuator element 216 which abuts the concave face of disk 204.

In the assembly 184, the piston 212 is held at a precise off-seat position so as to establish a minor pressure drop across the piston during normal flow of fluid through the valve assembly. At the desired valve set point, the increased pressure drop generates an axial force serving to push the actuator rod 214 through the rupture disk 204. This allows the piston 212 to come into seating engagement with valve seat 192 so as to close the valve and eliminate further fluid flow therethrough. This type of shutdown valve can be used in many applications such as in the tubes of tube and shell heat exchangers. If a tube ruptures, the valve assembly will close at an increased flow rate.

We claim:

1. A pressure responsive valve assembly comprising:
   a housing having an inlet and an outlet and a valve seat therein;
   a rupture disk presenting a rounded inner face and an outer face; and
   an actuating unit including an elongated actuator rod at least partially located within said housing, an actuator element adjacent the inner face of said rupture disk and operably coupled with said rod, said element presenting a rounded end adjacent said rounded inner face, and a pressure-responsive valve member operably coupled with said rod, engageable with said valve seat, and positioned to experience the pressure conditions at said inlet,
   said valve member and rod shiftable in response to an elevation in pressure at said inlet above a predetermined maximum to cause said valve member to move relative to said valve seat to establish or close communication between said inlet and said outlet, and also to cause said actuator element to move and rupture said disk, with said actuator element extending through the ruptured disk.

2. The assembly of claim 1, said inlet being tubular, said valve seat being formed in the tubular inlet, said valve member comprising a piston normally located within said tubular inlet in engagement with said valve seat and shiftable relative thereto in response to said elevated pressure.

3. The assembly of claim 1, said rupture disk comprising a metallic, concavo-convex disk.

4. The assembly of claim 3, at least one face of said disk having a line of weakness formed therein.

5. The assembly of claim 4, said line of weakness being a score line.

6. The assembly of claim 4, the inner face of said disk having said line of weakness formed therein.

7. The assembly of claim 4, there being a pair of intersecting lines of weakness formed in said one face.

8. The assembly of claim 4, there being a pair of opposed, arcuate lines of weakness formed in said one face, with an elongated, rectilinear line of weakness extending across said one face and joined with said arcuate lines of weakness.

9. The assembly of claim 1, said rupture disk comprising a metallic, reverse buckling rupture disk.

10. The assembly of claim 1, said rupture disk being a ceramic rupture disk.

11. The assembly of claim 1, said assembly being a relief valve, said valve member upon shifting thereof moving away from said valve seat and communicating said inlet and said outlet for pressure relief.

12. The assembly of claim 1, said assembly being a shutdown valve, said valve member upon shifting thereof moving toward and into engagement with said valve seat to block communication between said inlet and said outlet.

13. The assembly of claim 1, said housing also presenting a rupture disk opening, said rupture disk normally closing said opening, said actuator element coupled to and forming the end of said actuator rod.

14. The assembly of claim 1, said housing also presenting a rod-receiving opening, said actuator rod extending through rod-receiving opening, there being a linkage assembly operatively coupled between the end of said rod outside of said housing and said actuator element, said rupture disk being mounted outside of said housing and with the inner face thereof adjacent said actuator element.

15. The assembly of claim 1, including a biasing spring operatively coupled with said actuator rod for biasing the latter in a direction for urging the actuator element toward said rupture disk.

16. The assembly of claim 1, including a return spring operatively coupled with said actuator rod and compressible upon said shifting of said rod from an initial position to a position corresponding to rupture of said disk, said return spring serving to return said valve member towards said initial position thereof after rupture of said disk.

17. The assembly of claim 1, said inner face of said disk provided with a Teflon coating.

18. The assembly of claim 1, said housing being provided with a pair of opposed valve seats in spaced relationship from one another, a pair of opposed valve members, a stem interconnecting the directly opposed faces of each of the valve members, said stem and said faces presenting opposed annular surfaces on said valve members positioned to experience the pressure conditions at said inlet.

19. The assembly of claim 1, said housing being provided with a pair of opposed valve seats in spaced relationship from one another, a pair of opposed valve members, a stem interconnecting the directly opposed faces of each of the valve members, said stem and said faces presenting opposed annular surfaces on said valve members positioned to experience the pressure conditions at said inlet, said stem being provided with a passage extending therethrough communicating the region of the housing above the valve member in closest proximity to the rupture disc, with the outlet of the housing.

20. The assembly of claim 19, the area of the surface of the valve member adjacent to and facing the outlet being equal to the area of the surface of the other valve member in closest proximity to the rupture disk, minus the cross-sectional area of the rod connected thereto.

21. The assembly of claim 1, said housing being provided with a pair of opposed valve seats in spaced relationship from one another, a pair of opposed valve members, a stem interconnecting the directly opposed faces of each of the valve members, said stem and said faces presenting opposed annular surfaces on said valve members positioned to experience the pressure conditions at said inlet, said opposed surfaces being of unequal area with the surface of the valve member in closest proximity to the rupture disk being greater than the opposed surface area.

22. A bypass assembly for bypassing a valve located within a primary conduit in the event of valve failure, said bypass assembly comprising:
   a bypass valve comprising:
      a housing having an inlet and an outlet and a valve seat therein;
      a rupture disk presenting a rounded inner face and an outer face; and
      an actuating unit including an elongated actuator rod at least partially located within said housing, an actuator element adjacent the inner face of said rupture disk and operably coupled with said rod, said element presenting a rounded end adjacent said rounded inner face, and a pressure-responsive valve member operably coupled with said rod within said housing and positioned in engagement with said valve seat to normally block communication between said inlet and said outlet and to experience the pressure conditions at said inlet, said valve member and rod shiftable in response to an elevation in pressure at said inlet above a predetermined maximum for causing said valve member to shift away from said valve seat an amount sufficient to communicate said inlet and said outlet for pressure relief, and for causing the actuator element to move and rupture said disk, with said actuator element extending through the ruptured disk; and inlet and outlet conduits respectively in communication with said primary conduit on opposite sides of said primary conduit valve and said bypass valve inlet and outlet.

23. The assembly of claim 22, said inlet being tubular and having said valve seat formed therein, said valve member comprising a piston located within said tubular inlet and normally in engagement with said valve seat and shiftable relative thereto in response to said elevational pressure.

24. The assembly of claim 22, said rupture disk comprising a metallic, concavo-convex disk.

25. The assembly of claim 24, at least one face of said disk having a line of weakness formed therein.

26. The assembly of claim 25, said line of weakness being a score line.

27. The assembly of claim 23, the inner face of said disk having said line of weakness formed therein.

28. The assembly of claim 23, there being a pair of intersecting lines of weakness formed in said one face.

29. The assembly of claim 23, there being a pair of opposed, arcuate lines of weakness formed in said one face, with an elongated, rectilinear line of weakness extending across said one face and joined with said arcuate lines of weakness.

30. The assembly of claim 22, said rupture disk comprising a metallic, reverse buckling rupture disk.

31. The assembly of claim 22, said rupture disk being a ceramic rupture disk.

32. The assembly of claim 22, said housing also presenting a rupture disk opening, said rupture disk normally closing said opening, said actuator element coupled to and forming the end of said actuator rod.

33. The assembly of claim 22, said housing also presenting a rod-receiving opening, said actuator rod extending through rod-receiving opening, there being a linkage assembly operatively coupled between the end of said rod outside of said housing and said actuator element, said rupture disk being mounted outside of said housing and with the inner face thereof adjacent said actuator element.

34. The assembly of claim 22, including a biasing spring operatively coupled with said actuator rod for biasing the latter in a direction for urging the actuator element toward said rupture disk.

35. The assembly of claim 22, including a return spring operatively coupled with said actuator rod and compressible upon said shifting of said rod from an initial position to a position corresponding to rupture of said disk, said return spring serving to return said valve member towards said initial position thereof after rupture of said disk.

36. The assembly of claim 22, said inner face of said disk provided with a Teflon coating.

37. The assembly of claim 3, said disk having a concave inner face.

38. The assembly of claim 24, said disk having a concave inner face.

* * * * *